F. M. HAMBEK.
CHANGE SPEED GEARING.
APPLICATION FILED SEPT. 9, 1916.

1,312,981.

Patented Aug. 12, 1919.
3 SHEETS—SHEET 1.

Witness
P. M. Hunt.
N. A. Minnett

Inventor
F. M. Hambek.

By John Louis Walen
Attorney

F. M. HAMBEK.
CHANGE SPEED GEARING.
APPLICATION FILED SEPT. 9, 1916.

1,312,981.

Patented Aug. 12, 1919.
3 SHEETS—SHEET 2.

Inventor
F. M. Hambek.

Witness

By John Loris Waters
Attorney

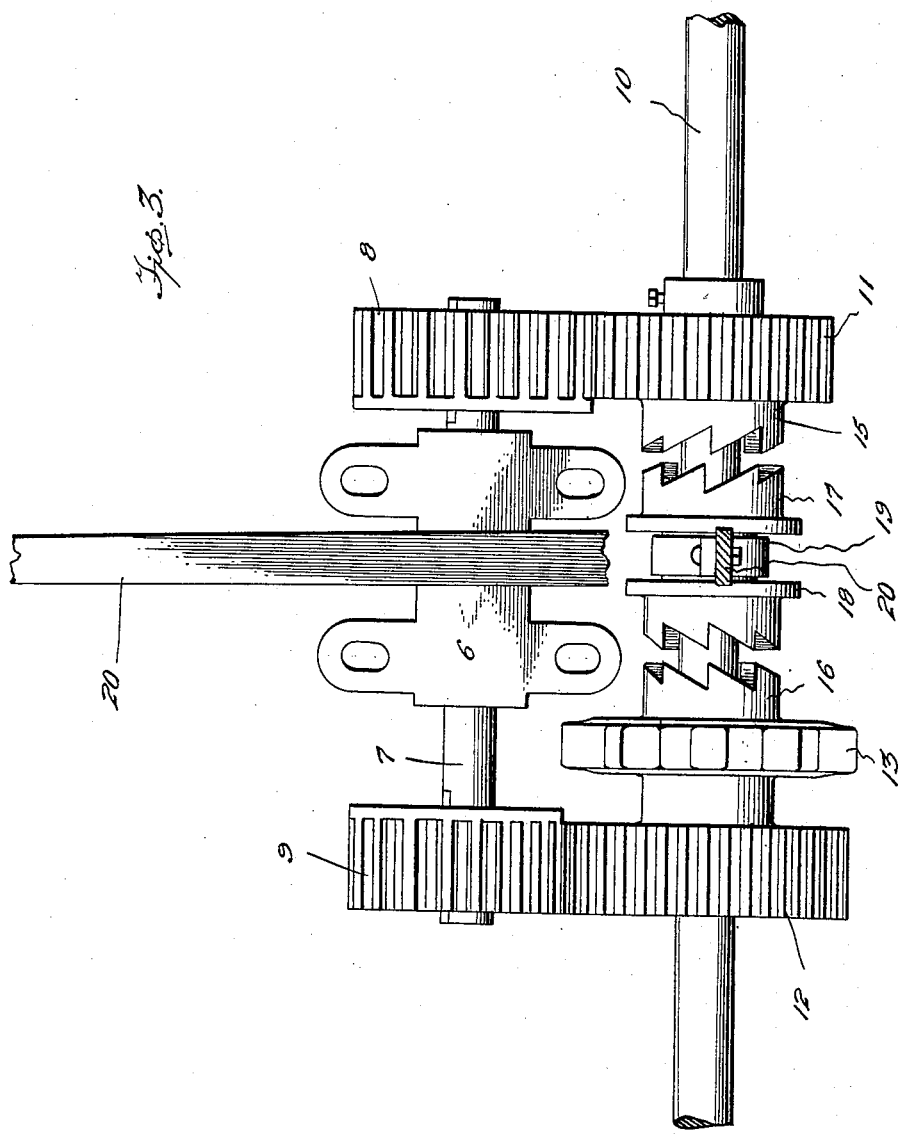

UNITED STATES PATENT OFFICE.

FRANK M. HAMBEK, OF LIDGERWOOD, NORTH DAKOTA.

CHANGE-SPEED GEARING.

1,312,981. Specification of Letters Patent. Patented Aug. 12, 1919.

Application filed September 9, 1916. Serial No. 119,231.

*To all whom it may concern:*

Be it known that I, FRANK M. HAMBEK, a citizen of the United States, residing at Lidgerwood, in the county of Richland and State of North Dakota, have invented certain useful Improvements in Change-Speed Gearing, of which the following is a specification, reference being had therein to the accompanying drawings.

This invention relates to improvements in change speed gearing, one object of the invention being the provision of manually controlled clutch transmission means through the medium of which two different speeds may be transmitted to the operating mechanism of a machine, the operation of which is selective and directly under the control of the operator.

A further object of this invention is the provision of a device of this character which is readily attachable upon various makes of binders and which will permit the operator to select at will the speed at which the machine is to be operated.

In the accompanying drawings:—

Fig. 3 is an enlarged detailed view of the attachment *per se*.

Figure 1:
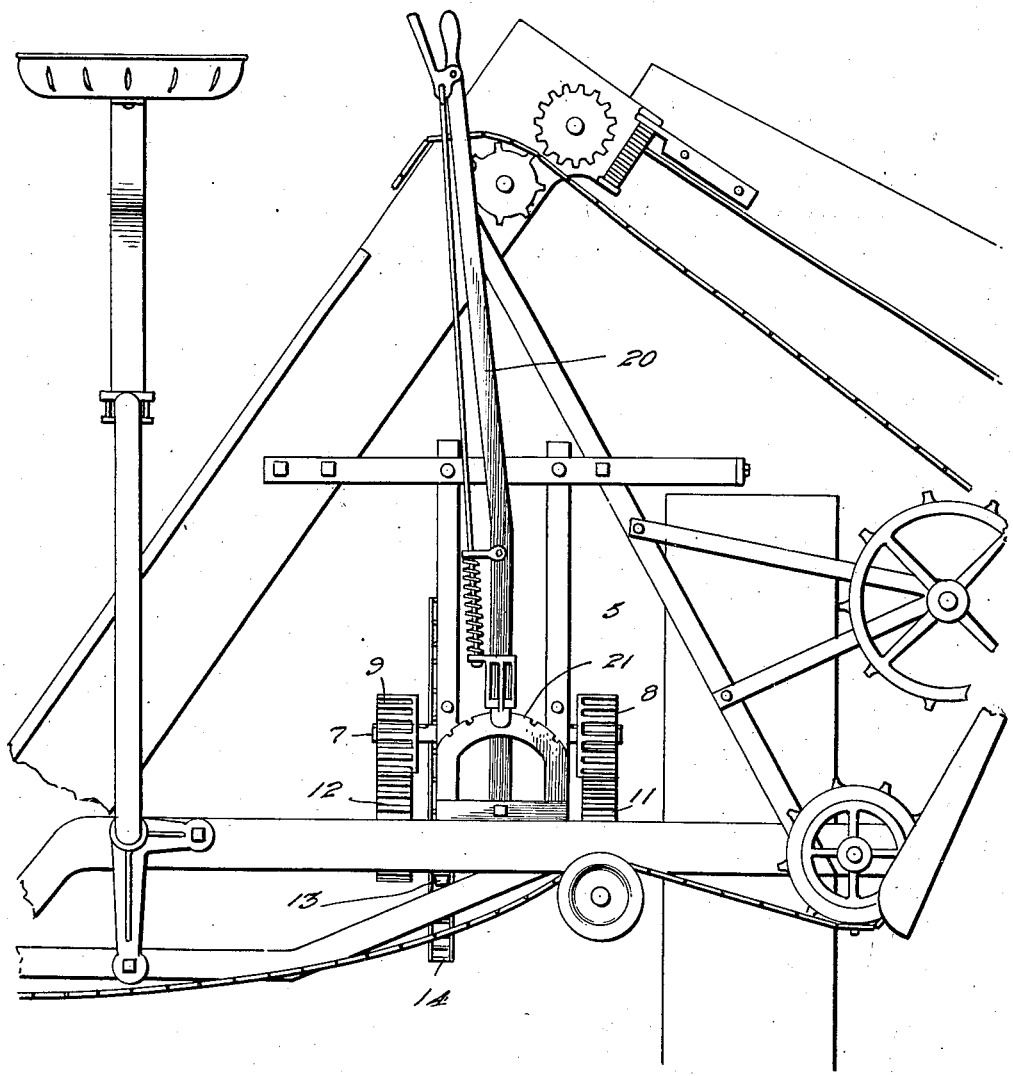
Figure 1 is a rear elevation of the portion of the binder to which the present invention is applied.
Figure 2:
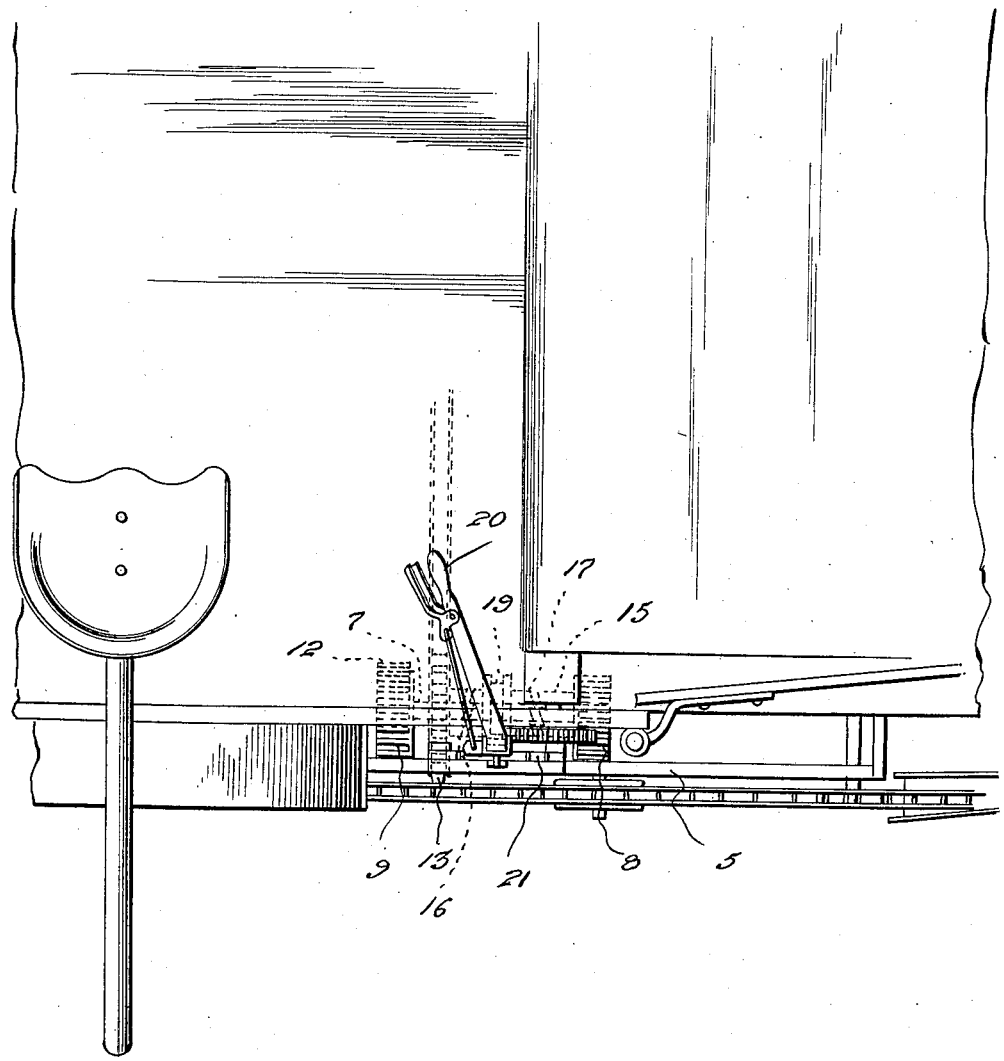
Fig. 2 is a top plan view thereof.

Referring to the drawings, the numeral 5 designates the frame of the binder which has attached thereto the casting 6 having journaled therein the shaft 7 which has keyed to the respective ends thereof the two varying diametered gear wheels 8 and 9, the latter of which is the smaller.

A drive shaft 10 has freely rotatable thereon the two large gears 11 and 12, the gear 12 having integral therewith a sprocket 13 which has passed thereover a bull chain 14.

The clutch members 15 and 16 are each carried by the respective gears 11 and 12, and are disposed in opposite relation, while splined upon the shaft between these two clutch members is a clutch sleeve 17 provided with the flange 18 for receiving the yoke 19 of the operating handle or lever 20. This lever is pivotally connected to the segment 21 attached to the frame of the machine.

By this means, the lever may be manipulated as desired to connect the main shaft directly with the bull sprocket, or through the opposite clutch member connect the bull sprocket through the four gears, thus providing two speeds for operating such main shaft.

What I claim as new is:—

A machine change speed device comprising a machine actuating shaft, a gear loose on the shaft, a combined gear and sprocket loose on the shaft, the gear and the combined gear and sprocket having opposing clutch objects and the sprocket being located between the gear and the clutch portion of the combined gear and sprocket, a clutch sleeve splined to the shaft and having clutch portions adapted to be alternately engaged with the first mentioned clutch portions, a countershaft, and gears carried on the countershaft and meshing with said loose gears for the purpose specified.

In testimony whereof I affix my signature.

FRANK M. HAMBEK.

Copies of this patent may be obtained for five cents each, by addressing the "Commissioner of Patents, Washington, D. C."